United States Patent
Bergstrom et al.

(10) Patent No.: US 11,292,388 B2
(45) Date of Patent: Apr. 5, 2022

(54) ELECTRO-OPTIC DRIVE SYSTEM FOR VEHICULAR MIRROR

(71) Applicant: Magna Mirrors of America, Inc., Holland, MI (US)

(72) Inventors: Eric P. Bergstrom, Grand Haven, MI (US); Eric Peterson, West Olive, MI (US); Christopher R. Koetje, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 455 days.

(21) Appl. No.: 16/512,565

(22) Filed: Jul. 16, 2019

(65) Prior Publication Data
US 2020/0023775 A1 Jan. 23, 2020

Related U.S. Application Data

(60) Provisional application No. 62/699,393, filed on Jul. 17, 2018.

(51) Int. Cl.
*G02F 1/163* (2006.01)
*B60R 1/08* (2006.01)

(52) U.S. Cl.
CPC .............. *B60R 1/088* (2013.01); *G02F 1/163* (2013.01); *G02F 2001/1635* (2013.01)

(58) Field of Classification Search
CPC .... G02F 1/163; G02F 2001/1635; G02F 1/15; G02F 1/0121; G02F 1/0123
See application file for complete search history.

(56) References Cited

U.S. PATENT DOCUMENTS

| | | |
|---|---|---|
| 4,712,879 A | 12/1987 | Lynam et al. |
| 5,066,112 A | 11/1991 | Lynam et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,406,414 A | 4/1995 | O'Farrell et al. |
| 5,525,264 A | 6/1996 | Cronin et al. |
| 5,567,360 A | 10/1996 | Varaprasad et al. |

(Continued)

*Primary Examiner* — Joseph P Martinez
(74) *Attorney, Agent, or Firm* — Honigman LLP

(57) ABSTRACT

A vehicular electrochromic rearview mirror assembly includes a base for attaching at a vehicle, a mirror casing at the base, and a mirror reflective element sub-assembly at the mirror casing and including an electrochromic (EC) cell and an EC driving circuit. The EC driving circuit includes a fixed voltage switching regulator for providing voltage to a power input of the EC cell, a drive transistor connected to an output of the fixed voltage switching regulator for switching the provided voltage on and off, a protection diode connected to the drive transistor and the EC cell, a bleach transistor connected to the power input of the EC cell and to ground, and a controller connected to the fixed voltage switching regulator, the drive transistor, and the bleach transistor. The controller controls the fixed voltage switching regulator, the drive transistor, and the bleach transistor to control the voltage provided to the EC cell.

20 Claims, 6 Drawing Sheets

(56) References Cited

U.S. PATENT DOCUMENTS

| | | | |
|---|---|---|---|
| 5,610,756 | A | 3/1997 | Lynam et al. |
| 5,668,663 | A | 9/1997 | Varaprasad et al. |
| 5,724,187 | A | 3/1998 | Varaprasad et al. |
| 5,910,854 | A | 6/1999 | Varaprasad et al. |
| 6,002,511 | A | 12/1999 | Varaprasad et al. |
| 6,154,306 | A | 11/2000 | Varaprasad et al. |
| 6,178,034 | B1 | 1/2001 | Allemand et al. |
| 6,449,082 | B1 | 9/2002 | Agrawal et al. |
| 6,690,268 | B2 | 2/2004 | Schofield et al. |
| 7,184,190 | B2 | 2/2007 | McCabe et al. |
| 7,195,381 | B2 | 3/2007 | Lynam et al. |
| 7,215,318 | B2 * | 5/2007 | Turnbull ................. B60R 1/088 345/105 |
| 7,255,451 | B2 | 8/2007 | McCabe et al. |
| 7,274,501 | B2 | 9/2007 | McCabe et al. |
| 7,289,037 | B2 | 10/2007 | Uken et al. |
| 7,360,932 | B2 | 4/2008 | Uken et al. |
| 7,626,749 | B2 | 12/2009 | Baur et al. |
| 8,049,640 | B2 | 11/2011 | Uken et al. |
| 8,277,059 | B2 | 10/2012 | McCabe et al. |
| 8,508,831 | B2 | 8/2013 | De Wind et al. |
| 8,529,108 | B2 | 9/2013 | Uken et al. |
| 8,730,553 | B2 | 5/2014 | De Wind et al. |
| 9,346,403 | B2 | 5/2016 | Uken et al. |
| 9,598,016 | B2 | 3/2017 | Blank et al. |
| 2014/0313563 | A1 | 10/2014 | Uken et al. |
| 2015/0097955 | A1 | 4/2015 | De Wind et al. |

\* cited by examiner

US 11,292,388 B2

ELECTRO-OPTIC DRIVE SYSTEM FOR VEHICULAR MIRROR

CROSS REFERENCE TO RELATED APPLICATION

The present application claims the filing benefits of U.S. provisional application Ser. No. 62/699,393, filed Jul. 17, 2018, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. The mirror reflective element may comprise a variable reflectance mirror reflective element that varies its reflectance responsive to electrical current applied to conductive coatings or layers of the reflective element.

SUMMARY OF THE INVENTION

The present invention provides an electrochromic rearview mirror assembly, such as an interior or exterior rearview mirror assembly. The mirror assembly includes a mirror reflective element sub-assembly that includes an electrochromic (EC) cell and an EC driving circuit. The EC driving circuit includes a fixed voltage switching regulator configured to provide voltage to a power input of the electrochromic (EC) cell and a drive transistor connected to an output of the fixed voltage switching regulator and configured to switch the provided voltage on and off to the EC cell. The circuit also includes a protection diode connected to the drive transistor and the EC cell and a bleach transistor connected to the power input of the EC cell and to ground. A controller is connected to the fixed voltage switching regulator, the drive transistor, and the bleach transistor, and the controller is configured to control the fixed voltage switching regulator, the drive transistor, and the bleach transistor to control the voltage provided to the EC cell.

These and other objects, advantages, purposes and features of the present invention will become apparent upon review of the following specification in conjunction with the drawings.

DESCRIPTION OF THE PREFERRED EMBODIMENTS

Figure 1:
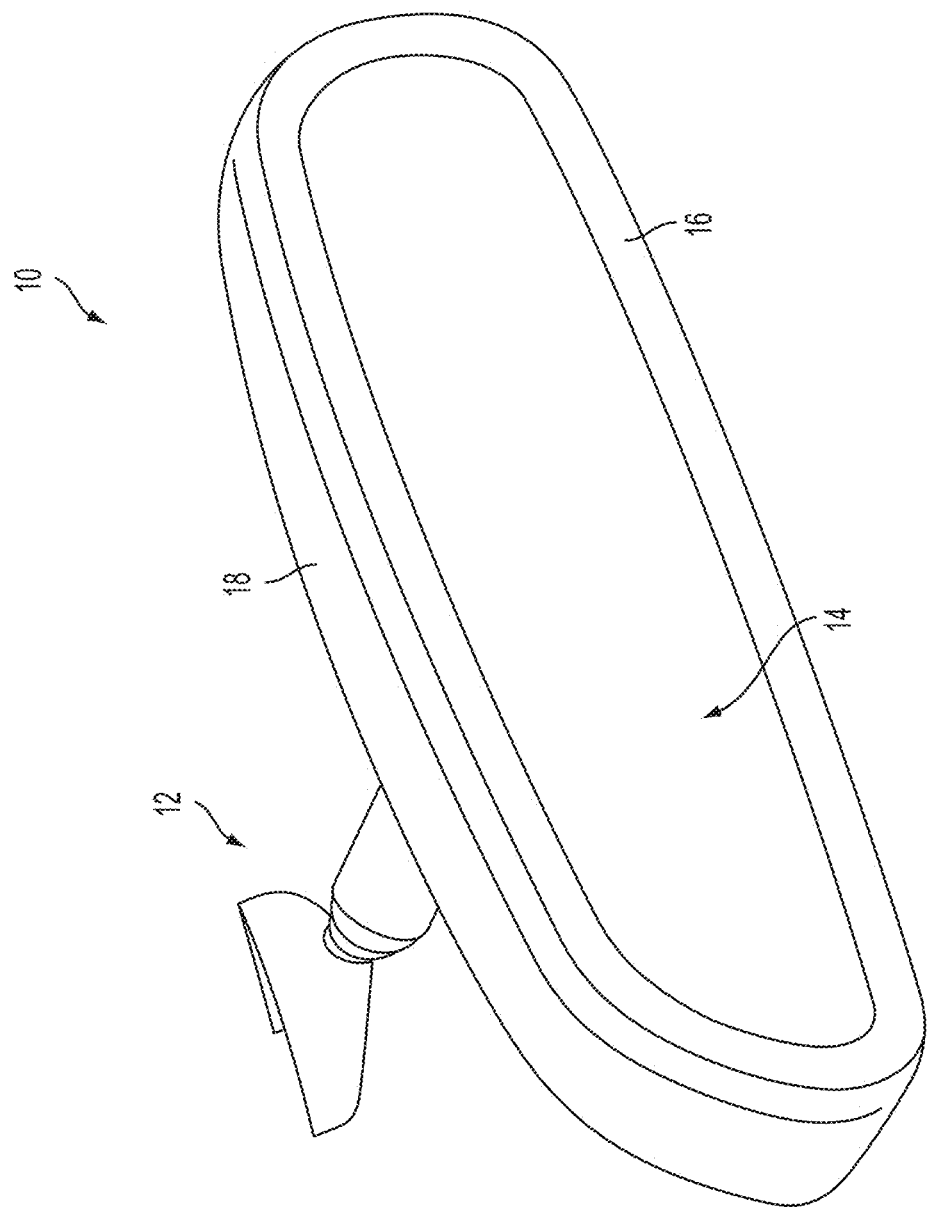
FIG. 1 is a perspective view of an interior rearview mirror assembly in accordance with the present invention.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted at an interior portion of a vehicle (such as to an interior or in-cabin surface of a vehicle windshield or a headliner of a vehicle or the like) via a mounting structure or mounting configuration or assembly 16, where the mirror reflective element and mirror head may be adjusted by a driver of the vehicle to provide the driver with the desired view rearward of the vehicle. Optionally, the mirror reflective element and electrochromic drive system may be implemented in an exterior rearview mirror assembly, where the base is mounted at a side portion of the vehicle and the mirror reflective element is adjusted relative to the base and the side portion of the vehicle, such as via an electrically powered actuator that is actuated or controlled via the driver of the vehicle. The mirror reflective element comprises a variable reflectance mirror reflective element that varies its reflectance responsive to electrical current applied to conductive coatings or layers of the reflective element.

Figure 2:
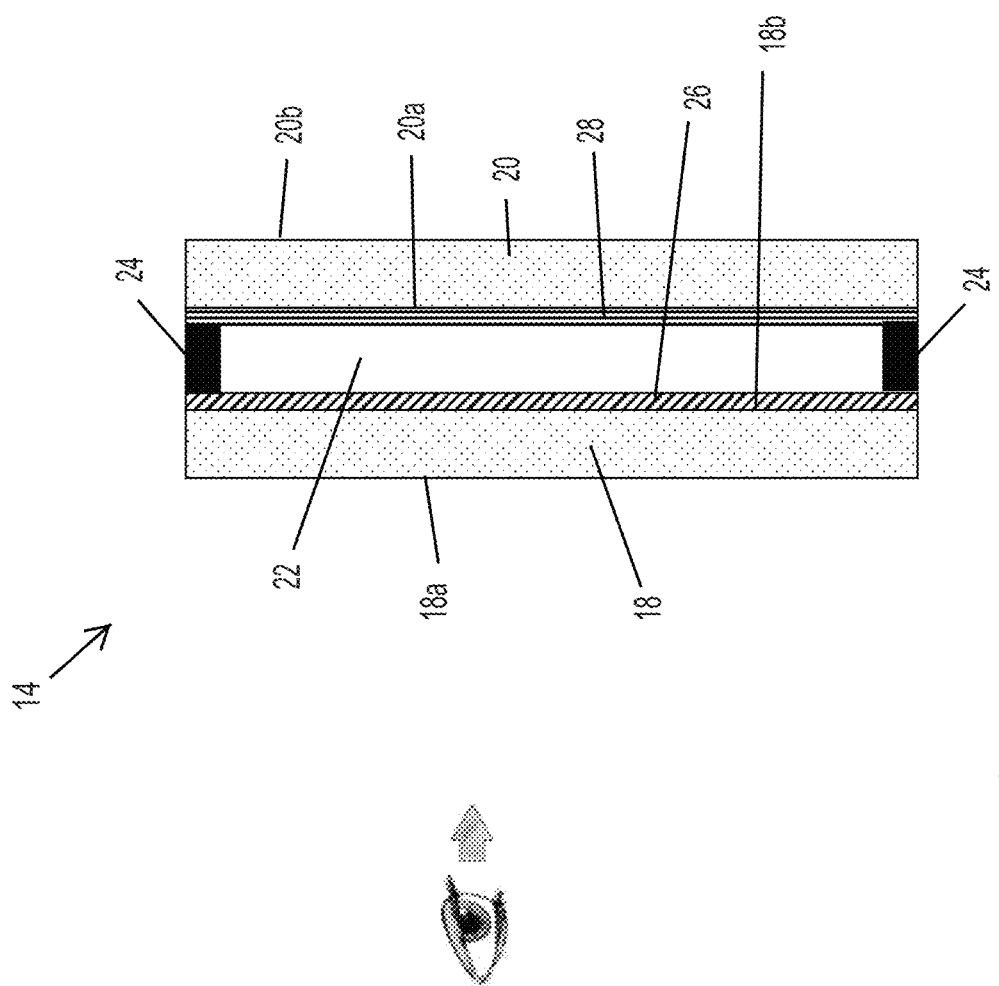
FIG. 2 is a cross-sectional view of a mirror reflective element with variable reflectance in accordance with the present invention.

In the illustrated embodiment, and as shown in FIG. 2, the mirror reflective element 14 comprises a laminate construction variable reflectance electro-optic (such as electrochromic) reflective element assembly having a front substrate 18 and a rear substrate 20 with an electro-optic medium 22 (such as electrochromic (EC) medium) sandwiched therebetween and bounded by a perimeter seal 24. As shown in FIG. 2, front substrate 18 has a front or first surface 18*a* (the surface that generally faces the driver of a vehicle when the mirror assembly is normally mounted at the vehicle) and a rear or second surface 18*b* opposite the front surface 18*a*, and rear substrate 20 has a front or third surface 20*a* and a rear or fourth surface 20*b* opposite the front surface 20*a*, with the electro-optic medium 22 disposed between the second surface 18*b* and the third surface 20*a* and bounded by the perimeter seal 24 of the reflective element (such as is known in the electrochromic mirror art). The second surface 18*a* has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20*a* has a metallic reflector coating 28 (or multiple layers or coatings) established thereat. The front or third surface 20*a* of rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 6,449,082; 5,140,455; 5,151,816; 6,178,034; 6,154,306; 6,002,511; 5,567,360; 5,525,264; 5,610,756; 5,406,414; 5,253,109; 5,076,673; 5,073,012; 5,066,112; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The electrochromic reflective element or EC cell requires precise power control in order to provide on-demand variable dimming. The EC cell requires a control circuit or EC drive circuit that controls the EC cells responsive to, for example, an ambient light sensor and/or a glare light sensor (whereby, in nighttime driving conditions, the EC drive circuit dims or darkens the EC cell to reduce glare light at the mirror reflective element or cell when viewed by the driver of the vehicle). The ambient light sensor may be disposed anywhere at the vehicle (such as, for example, at the respective mirror assembly). The glare sensor is typically at or near the respective EC cell or mirror reflective element (such as behind the mirror reflective element and viewing/sensing through the mirror reflective element). Responsive to detection of glare at the glare sensor and EC cell, the EC drive circuit applies an appropriate or selected voltage at the electrically conductive coatings at the opposing surfaces of the glass substrate (that oppose and contact the EC medium) to cause an appropriate or selected degree of darkening of the EC cell to vary or attenuate reflectance off the mirror reflector (at the rear substrate and behind the EC medium) to reduce reflectance of light to the driver of the vehicle that is viewing the mirror assembly and EC cell.

Figure 3:
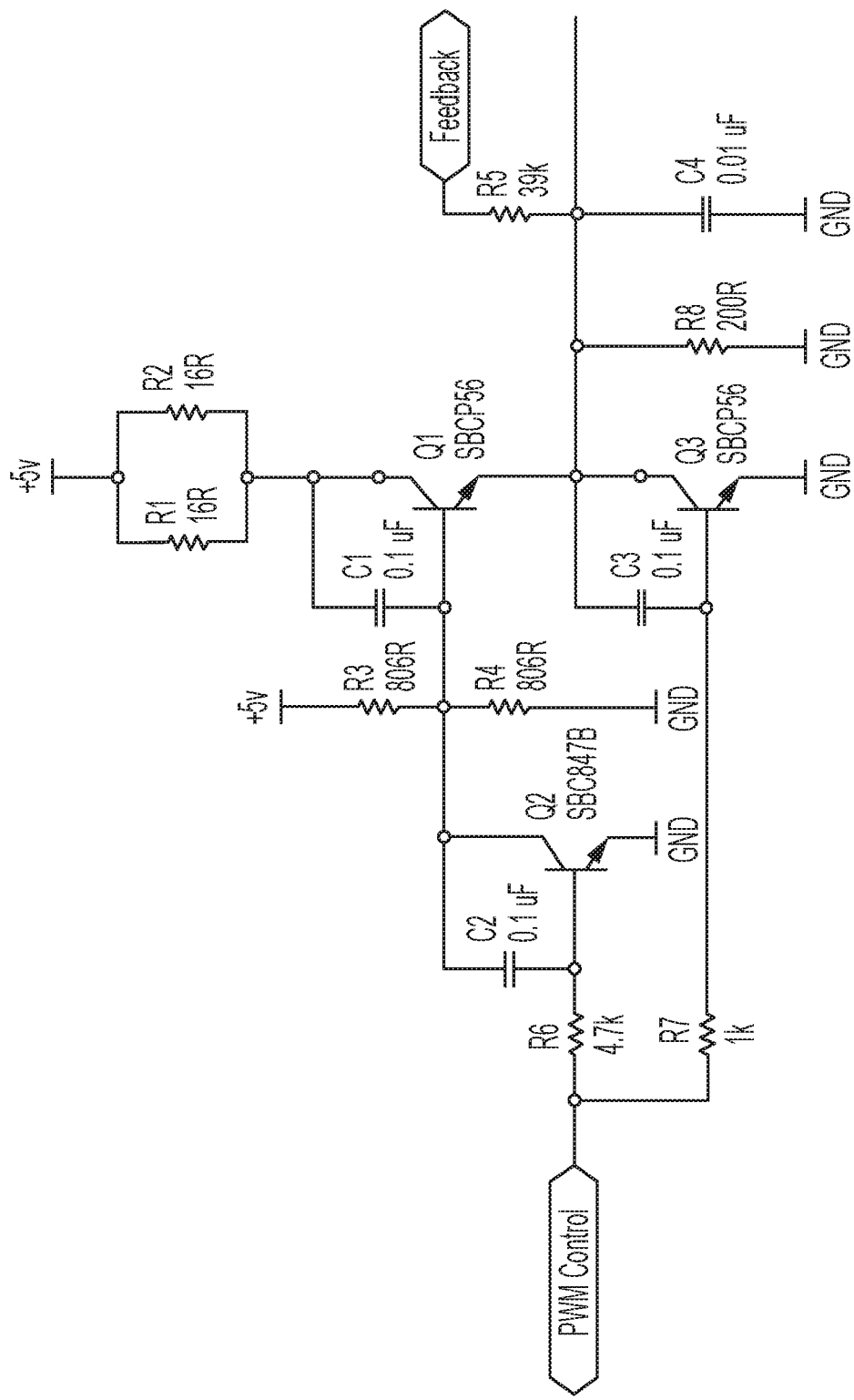
FIG. 3 is a schematic of a typical electrochromic drive circuit.

As shown in FIG. 3, a typical control circuit includes a "drive" transistor Q1 and a "bleach" transistor Q2 that are driven in complement. A pulse-width modulation (PWM) control signal adjusts the voltage provided to the EC cell by switching the transistors on and off. This causes a ripple voltage on each EC cell powered by the circuit. The typical circuit of FIG. 3 inefficiently dissipates power in three areas: in a regulator, in ballast resistors, and in the transistors. Further power is often wasted in stepping down the voltage from 5V or 8V to 1.2V. Often an inefficient linear regulator is used to generate the 5V or 8V supply (e.g., from the vehicle 12V supply), further increasing power losses. Additionally, due to saturation, the control voltage is limited by the bias voltage on the drive transistor.

Figure 4:
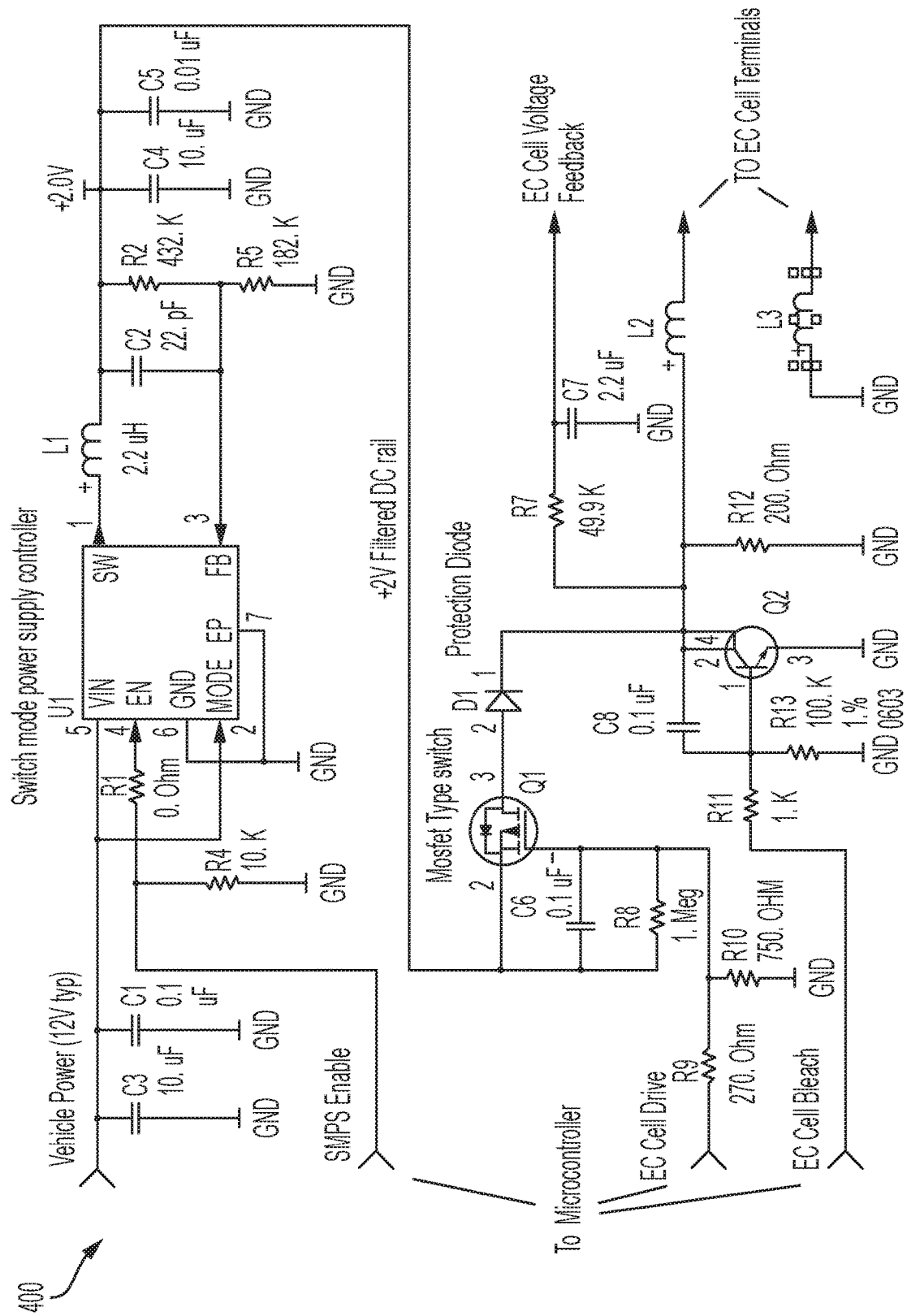
FIG. 4 is a schematic of an electrochromic drive circuit in accordance with the present invention.

Referring now to FIG. 4, a switch mode power supply (SMPS) EC driving circuit 400 is provided in accordance with the present invention. The circuit 400 provides power to one or more EC cells through a fixed voltage switching regulator (e.g., 2V output) controlled by switch mode power supply controller U1. MOSFET Q1 (metal-oxide-semiconductor field-effect transistor) serves as a drive transistor, and the transistor Q1 acts as a low resistance switch with minimal power loss. A bleach transistor Q2 may be a bipolar junction transistor (BJT). Protection diode D1 shields MOSFET Q1 from foreign or otherwise unwanted voltages. A feedback path (EC Cell Voltage Feedback) monitors the EC cell voltage and allows an EC controller (shown in FIG. 5) to completely shut down the EC cell if a fault is detected. The circuit 400 minimizes cut through currents, as the EC controller drives the drive transistor Q1 and the bleach transistor Q2 independently. When the circuit 400 determines that dimming is not necessary, the EC controller can shut down the 2V output completely (through the SMPS Enable output), saving power. The EC controller provides a PWM input to the transistors Q1, Q2, allowing for rapid switching and high resolution EC cell voltage control. Further, the EC controller and the power supply controller U1 provide short circuit and thermal protections via integrated safeguards. The circuit 400 may use a variety of buck regulator integrated circuit (IC) devices depending on specific input voltage requirements.

Figure 5:
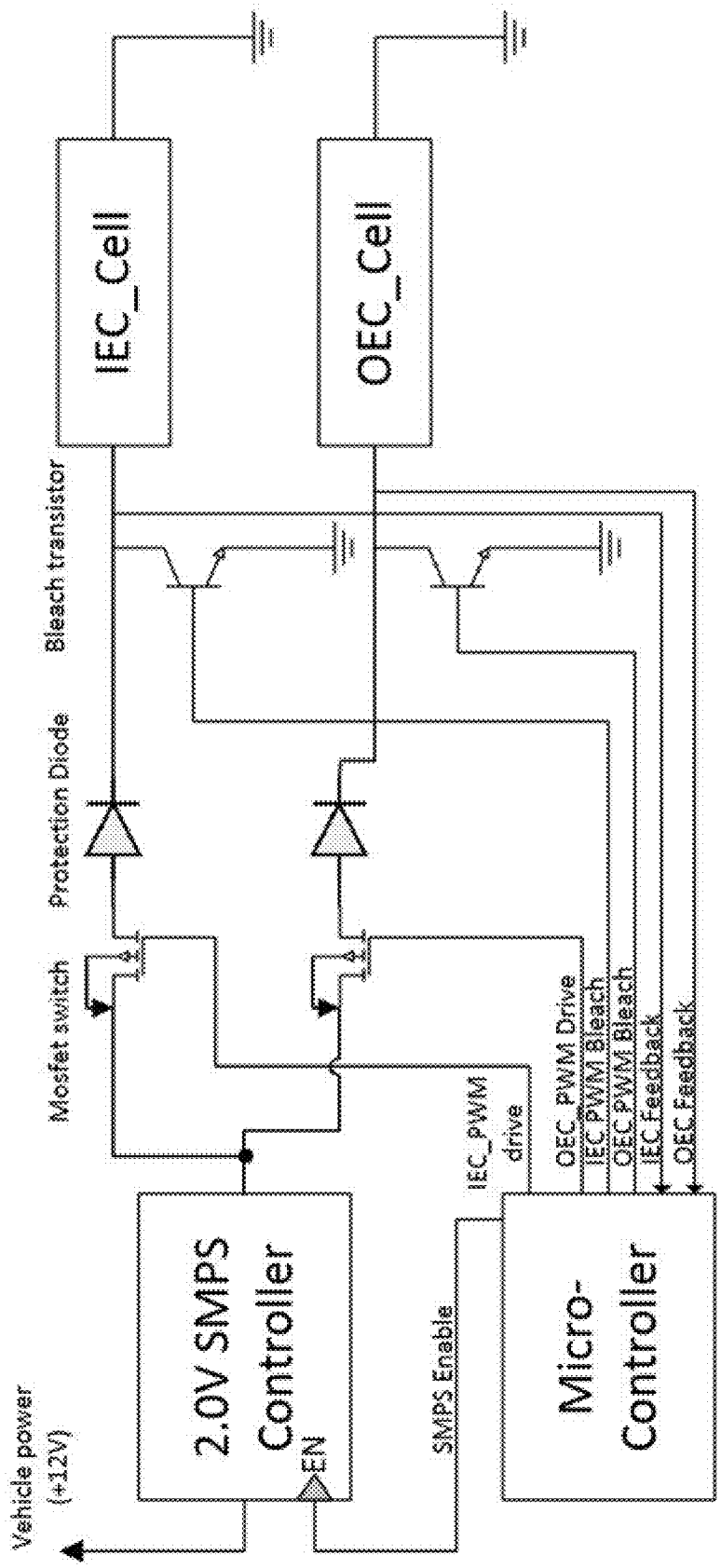
FIG. 5 is a block diagram of electrochromic drive and control system in accordance with the present invention.

FIG. 5 illustrates a block diagram of the previously described EC driving circuit 400, demonstrating the EC controller (microcontroller) driving an enable input to the SMPS controller, and PWM inputs to the drive transistor and bleach transistor. The EC controller receives feedback from each individual EC cell (e.g., voltage, temperature, etc.), for example, an input EC cell (IEC) and an output EC cell (OEC). The SMPS controller may receive a range in input voltage (e.g., the vehicle's 12V battery supply, which may typically range from 12.6V up to over 14.7V) and output the voltage required by the EC cells (e.g., 2V). The protection diodes ensure unwanted voltages are not passed through the circuit.

Figure 6A:
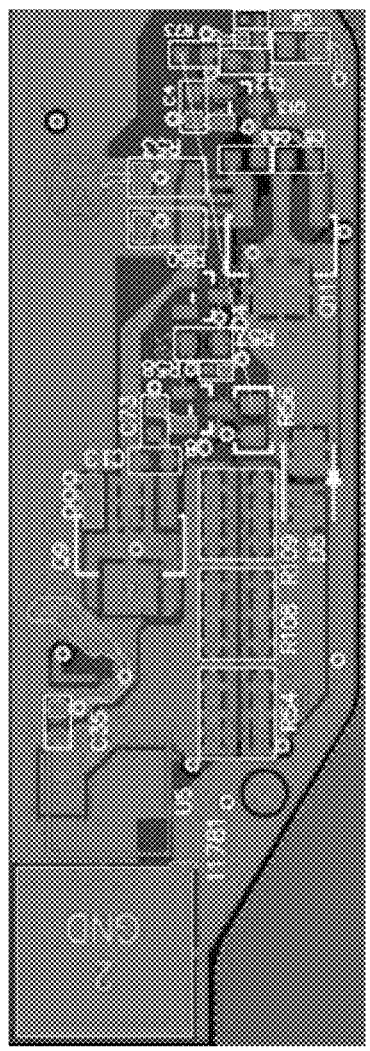
FIG. 6A is a plan view of a typical electrochromic drive printed circuit board.
Figure 6B:
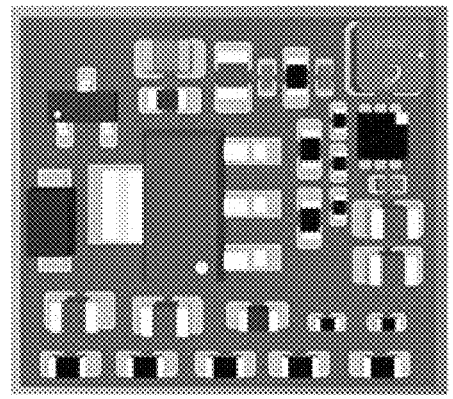
FIG. 6B is a plan view of an electrochromic drive printed circuit board in accordance with the present invention.

The circuit 400 allows for an unregulated (e.g., from 4.5V to 36V) voltage input with significant efficiency increases over typical circuits. For example, a typical circuit is approximately 9 percent efficient, while the EC driving circuit 400 is greater than 50 percent efficient (e.g., 55 percent to 60 percent efficient or 57 percent to 60 percent efficient). This leads to a drastically reduced power draw (e.g., 0.2 W from circuit 400 instead of 1.4 W from a typical driving circuit). As shown in FIGS. 6A and 6B, the circuit 400 also allows for a significantly reduced printed circuit board (PCB) area. For example, a typical circuit (FIG. 6A) may require approximately 1000 mm$^2$, while circuit 400 (FIG. 6B) may have a board area of approximately 300 mm$^2$.

Thus, the circuit 400 of the present invention minimizes power losses through the use of a low resistance switch and low source voltage (e.g., 2V). This leads to a reduction in power dissipated and therefore a reduction in temperature. The PWM control allows for fine adjustment of EC cell dimming. Dynamic feedback provides precise reporting of EC cell status, and the EC cell may be shut down completely if a fault is detected. The standby current that circuit 400 consumes while the EC cell is disabled is much lower than a typical driving circuit. A single switching regulator can drive two or more EC cells simultaneously with much less PCB area required. The switching regulator allows for stable operation over a wide range of input voltages and temperatures and may be fine-tuned with software to further increase performance under specific conditions or for specific applications. While the illustrated embodiment demonstrates an interior mirror, EC driving circuit 400 is suitable for any EC cell, including those found in exterior mirrors.

As discussed above, the electro-optic or electrochromic mirror assembly includes an electro-optic or electrochromic reflective element that is dimmed or darkened via an EC drive circuit. The electrochromic mirror element of the electrochromic mirror assembly may utilize the principles disclosed in commonly assigned U.S. Pat. Nos. 8,730,553; 8,508,831; 7,626,749; 7,274,501; 7,255,451; 7,195,381; 7,184,190; 6,690,268; 5,140,455; 5,151,816; 6,178,034; 6,154,306; 6,002,544; 5,910,854; 5,724,187; 5,668,663; 5,610,756; 5,567,360; 5,525,264; 5,406,414; 5,253,109; 5,142,407; 5,076,673; 5,073,012; 5,066,112; 5,117,346 and/or 4,712,879, which are hereby incorporated herein by reference in their entireties. The perimeter edges of the reflective element may be encased or encompassed by the perimeter element or portion of the bezel portion to conceal and contain and envelop the perimeter edges of the substrates and the perimeter seal disposed therebetween.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529, 108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736; and/or US-2010-0097469, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular electrochromic rearview mirror assembly, said vehicular electrochromic rearview mirror assembly comprising:
   a base configured to attach at a vehicle;
   a mirror casing attached at the base;
   a glare light sensor;
   a mirror reflective element sub-assembly disposed at the mirror casing, the mirror reflective element sub-assembly comprising an electrochromic (EC) cell and an EC driving circuit;
   wherein the EC cell comprises a front glass substrate and a rear glass substrate having an EC medium sandwiched therebetween and bounded by a perimeter seal;
   wherein the EC driving circuit comprises:
      (i) a fixed voltage switching regulator configured to provide electrical voltage to a power input of the EC cell,
      (ii) a drive transistor connected to an output of the fixed voltage switching regulator and configured to switch the provided electrical voltage on and off,
      (iii) a protection diode connected to the drive transistor and the EC cell,
      (iv) a bleach transistor connected to the power input of the EC cell and to ground, and
      (v) a controller connected to the fixed voltage switching regulator, the drive transistor, and the bleach transistor, wherein the controller controls the fixed voltage switching regulator, the drive transistor, and the bleach transistor to control the electrical voltage provided to the EC cell; and
   wherein the controller, responsive to input from the glare light sensor, controls the electrical voltage provided to the EC cell to variably darken the EC cell.

2. The vehicular electrochromic rearview mirror assembly of claim 1, wherein the drive transistor comprises a metal-oxide-semiconductor field-effect transistor.

3. The vehicular electrochromic rearview mirror assembly of claim 1, wherein the bleach transistor comprises a bipolar junction transistor.

4. The vehicular electrochromic rearview mirror assembly of claim 1, wherein the controller determines a fault in the EC cell or EC driving circuit, and wherein, responsive to determining the fault, the controller disables power to the EC cell.

5. The vehicular electrochromic rearview mirror assembly of claim 4, wherein the controller determines a fault based on an EC cell voltage feedback signal.

6. The vehicular electrochromic rearview mirror assembly of claim 1, wherein the controller controls the drive transistor and the bleach transistor independently.

7. The vehicular electrochromic rearview mirror assembly of claim 1, wherein the controller determines when dimming is unnecessary, and wherein, responsive to determining that dimming is unnecessary, the controller disables the fixed voltage switching regulator.

8. The vehicular electrochromic rearview mirror assembly of claim 7, wherein the controller, responsive at least in part to an output of an ambient light sensor at the vehicle, determines that dimming is unnecessary.

9. The vehicular electrochromic rearview mirror assembly of claim 1, wherein the controller provides an enable input to the fixed voltage switching regulator that enables and disables the fixed voltage switching regulator.

10. The vehicular electrochromic rearview mirror assembly of claim 1, wherein the controller provides a pulse-width modulation signal to the drive transistor and to the bleach transistor.

11. The vehicular electrochromic rearview mirror assembly of claim 1, wherein the controller receives feedback from the EC cell.

12. The vehicular electrochromic rearview mirror assembly of claim 1, wherein said vehicular electrochromic rearview mirror assembly comprises an interior vehicular electrochromic rearview mirror assembly, and wherein the base is configured to attach at an interior portion of the vehicle, and wherein the mirror casing is movably attached at the base, and wherein the mirror reflective element sub-assembly is movably disposed at the mirror casing.

13. The vehicular electrochromic rearview mirror assembly of claim 1, wherein said vehicular electrochromic rearview mirror assembly comprises an exterior vehicular electrochromic rearview mirror assembly, and wherein the base is configured to attach at an exterior side portion of the vehicle, and wherein the mirror reflective element sub-assembly is movable relative to the base at the exterior side portion of the vehicle via an actuator.

14. A vehicular electrochromic rearview mirror assembly, said vehicular electrochromic rearview mirror assembly comprising:
a base configured to attach at a vehicle;
a mirror casing attached at the base;
a glare light sensor;
a mirror reflective element sub-assembly disposed at the mirror casing, the mirror reflective element sub-assembly comprising an electrochromic (EC) cell and an EC driving circuit;
wherein the EC cell comprises a front glass substrate and a rear glass substrate having an EC medium sandwiched therebetween and bounded by a perimeter seal;
wherein the EC driving circuit comprises:
(i) a fixed voltage switching regulator configured to provide electrical voltage to a power input of the EC cell,
(ii) a drive transistor connected to an output of the fixed voltage switching regulator and configured to switch the provided electrical voltage on and off,
wherein the drive transistor comprises a metal-oxide-semiconductor field-effect transistor,
(iii) a protection diode connected to the drive transistor and the EC cell,
(iv) a bleach transistor connected to the power input of the EC cell and to ground, wherein the bleach transistor comprises a bipolar junction transistor, and
(v) a controller connected to the fixed voltage switching regulator, the drive transistor, and the bleach transistor, wherein the controller controls the fixed voltage switching regulator, the drive transistor, and the bleach transistor to control electrical voltage provided to the EC cell; and
wherein the controller, responsive to input from the glare light sensor, controls electrical voltage provided to the EC cell to variably darken the EC cell.

15. The vehicular electrochromic rearview mirror assembly of claim 14, wherein the controller determines a fault in the EC cell or EC driving circuit, and wherein, responsive to determining the fault, the controller disables power to the EC cell.

16. The vehicular electrochromic rearview mirror assembly of claim 15, wherein the controller determines a fault based on an EC cell voltage feedback signal.

17. The vehicular electrochromic rearview mirror assembly of claim 14, wherein the controller controls the drive transistor and the bleach transistor independently.

18. The vehicular electrochromic rearview mirror assembly of claim 14, wherein the controller determines when dimming is unnecessary, and wherein, responsive to determining that dimming is unnecessary, the controller disables the fixed voltage switching regulator.

19. A vehicular electrochromic rearview mirror assembly, said vehicular electrochromic rearview mirror assembly comprising:
a base configured to attach at a vehicle;
a mirror casing attached at the base;
a glare light sensor;
a mirror reflective element sub-assembly disposed at the mirror casing, the mirror reflective element sub-assembly comprising an electrochromic (EC) cell and an EC driving circuit;
wherein the EC cell comprises a front glass substrate and a rear glass substrate having an EC medium sandwiched therebetween and bounded by a perimeter seal;
wherein the EC driving circuit comprises:
(i) a fixed voltage switching regulator configured to provide electrical voltage to a power input of the EC cell,
(ii) a drive transistor connected to an output of the fixed voltage switching regulator and configured to switch the provided electrical voltage on and off,
(iii) a protection diode connected to the drive transistor and the EC cell,
(iv) a bleach transistor connected to the power input of the EC cell and to ground, and
(v) a controller connected to the fixed voltage switching regulator, the drive transistor, and the bleach transistor, wherein the controller controls the fixed voltage switching regulator, the drive transistor, and the bleach transistor to control electrical voltage provided to the EC cell;
wherein the controller controls the drive transistor and the bleach transistor independently;
wherein the controller, responsive to input from the glare light sensor, controls electrical voltage provided to the EC cell to variably darken the EC cell; and
wherein the controller determines when dimming is unnecessary, and wherein, responsive to determining that dimming is unnecessary, the controller disables the fixed voltage switching regulator.

20. The vehicular electrochromic rearview mirror assembly of claim 19, wherein the controller provides a pulse-width modulation signal to the drive transistor and to the bleach transistor.

* * * * *